A. BOZEK.
BEET HARVESTER.
APPLICATION FILED FEB. 27, 1919.

1,377,393.

Patented May 10, 1921.
3 SHEETS—SHEET 1.

Inventor
A. Bozek.

Attorney

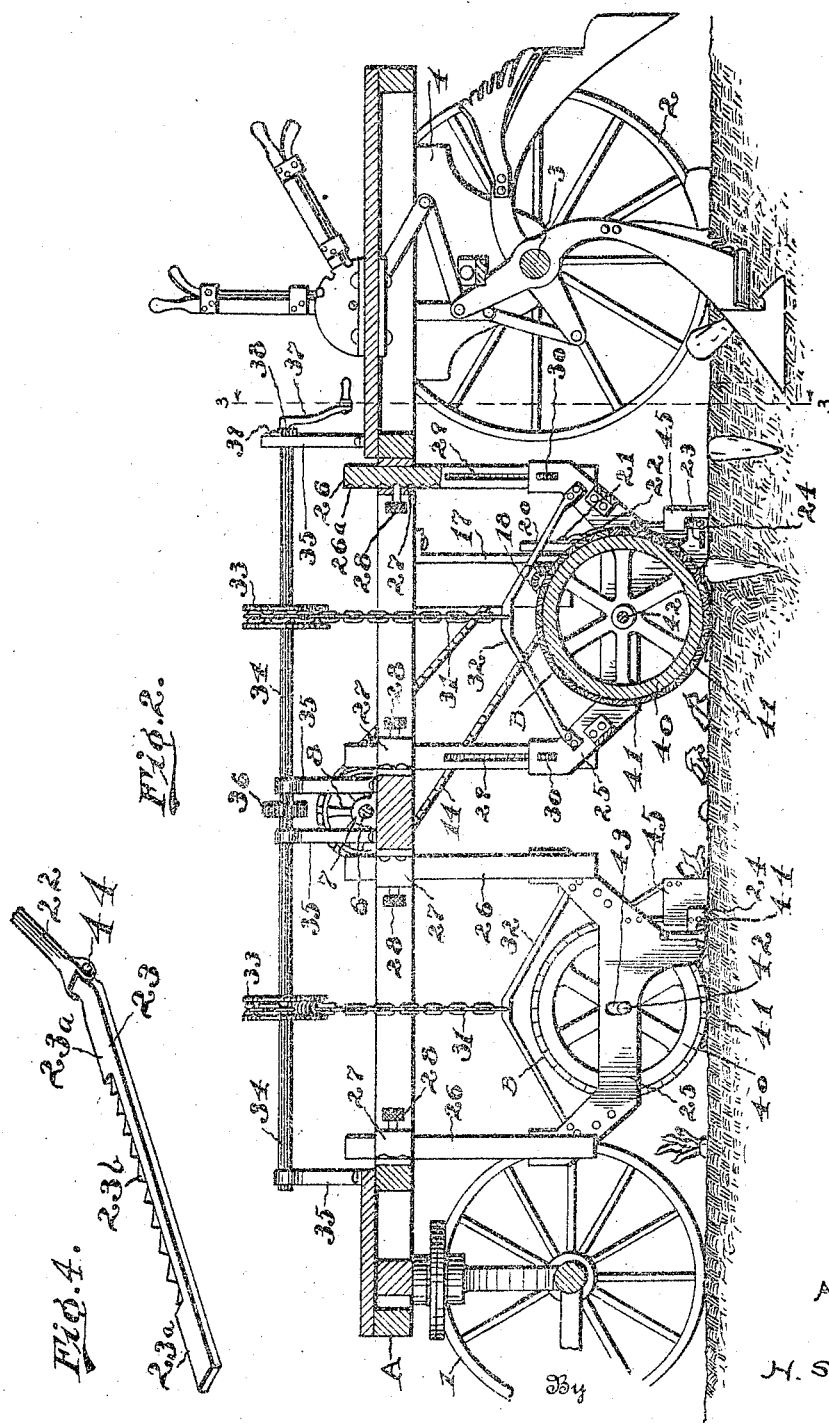

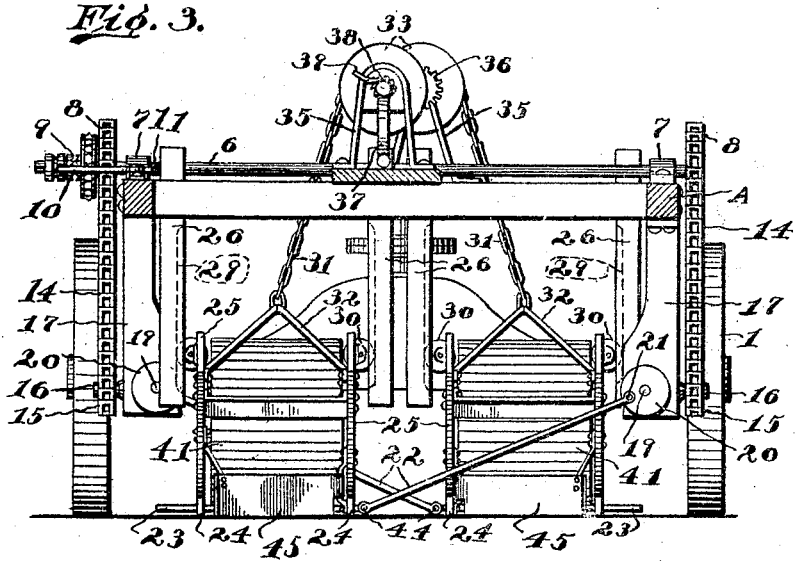

UNITED STATES PATENT OFFICE.

ALBERT BOZEK, OF GEBO, WYOMING.

BEET-HARVESTER.

1,377,393. Specification of Letters Patent. Patented May 10, 1921.

Application filed February 27, 1919. Serial No. 279,484.

*To all whom it may concern:*

Be it known that I, ALBERT BOZEK, a citizen of the United States, residing at Gebo, in the county of Hot Springs, State of Wyoming, have invented a new and useful Beet-Harvester; and I do hereby declare the following to be a full, clear, and exact description of the invention, such as will enable others skilled in the art to which it appertains to make and use the same.

The present invention relates to a beet harvester, and has for its object to provide a device of this character which embodies novel features of construction whereby the tops are removed from the beets.

Further objects of the invention are to provide a novel cutter for severing the tops from the beets in a uniform manner, the cutter operating in substantially the same way upon both high and low beets.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which:—

Figure 1 is a top plan view of a beet harvester constructed in accordance with the invention, a portion of the main frame being broken away at one side thereof.

Fig. 2 is a longitudinal sectional view on the line 2—2 of Fig. 1, looking in the direction of the arrows.

Fig. 3 is a transverse sectional view on the line 3—3 of Fig. 2, looking in the direction of the arrows.

Fig. 4 is a detail view of one of the reciprocating cutters.

Corresponding and like parts are referred to in the following description and indicated in all the views of the drawings by the same reference characters.

Referring to the drawings, which illustrate one embodiment of the invention, the reference character A designates a main frame which is substantially rectangular in shape and is supported upon the front wheels 1 and rear wheels 2, the latter being rigid with an axle 3 which is journaled within the bearings 4. This axle has a chain and sprocket connection 5 with a transverse shaft 6 which extends across the top of the main frame A at an intermediate point in the length thereof, said shaft being journaled within the bearings 7 and being provided at its opposite ends with sprocket wheel 8. A conventional clutch 9 controls the driving of the transverse shaft 6 by the chain and sprocket connection 5, said clutch being controlled by a shifting lever 10 which is pivoted upon the frame A and connected by a rearwardly extending link 11 to a hand lever 12 which is located adjacent the seat 13. This lever enables the operator to open and close the clutch 9 at will, and when the clutch is open the driving connection between the rear wheels and the transverse shaft 6 is broken.

The sprocket wheels 8 are arranged at opposite sides of the main frame A and are connected by chains 14 to small sprockets 15 which are rigid with short shafts 16 journaled in angle iron brackets 17 which project downwardly from opposite sides of the main frame. One of these brackets 17 is located in advance of the transverse shaft 6, while the other bracket is located to the rear thereof, and the inner end of each of the short shafts 16 is connected by bevel pinions 18 to a short shaft 19 which is arranged at right angles thereto and journaled in the opposite side or flange of the angle iron bracket 17. The second shaft 19 of each bracket is provided with a disk 20 which has an eccentric pivotal connection 21 with a transversely extending pitman 22, said pitmen extending transversely in opposite directions and being connected at their opposite ends to the reciprocating cutters 23.

The reciprocating cutters 23 are slidably mounted within suitable openings formed in guide arms 24 which extend downwardly from opposite sides of vertically adjustable frames 25. A roller B is journaled within each of the frames 25 in advance of the cutter 23, and the frames are mounted for vertical adjustment upon guide bars 26 which are arranged at the corners of the frames and extend downwardly from the main frame A. These two cutter carrying frames 25 are arranged upon opposite sides of the main frame A and one in advance of the other, thereby providing for operating upon two rows of beets at the same time. The upper ends of the guide bars 26 are shown as being adjustably received within keepers 27 which are rigidly secured to the main frame, one side of each of the guide bars being formed with a series of depressions 26ª of which a selected one is adapted to be engaged by a set screw 28 to lock the guide bar rigidly in an adjusted position. The inner faces of the guide bars 26 are formed with longitudinal grooves 29 which terminate short of the lower ends of the guide bars and receive anti-friction rollers 30 which are journaled upon the ends of the frames 25. The cutter carrying frames 25 are thus mounted in such a manner that they can readily be moved upwardly into an inoperative position, or downwardly into an operative position, as may be desired.

A chain or cable 31 is connected to each of the cutter supporting frames 25, the lower end of each of the chains being connected to the middle portion of a skeleton hanger 32 which is secured to the frame, while the upper end of the chain is connected to the periphery of a grooved roller or pulley 33. The two pulleys 33 are rigid with longitudinally extending shafts 34 which are offset laterally from each other, said shafts being journaled in standards 35, and the adjacent ends of the shafts being connected by the pinions 36 so that the two shafts are operable in unison with each other. The rear end of the rear shaft 34 is provided with a crank handle 37 and also with a ratchet wheel 38 which is adapted to be engaged by a pawl 39 to lock the shafts against backward rotation when they have been operated to lift the cutter carrying frames 25. It will thus be obvious that by suitably manipulating the crank handle 37, which is arranged in a position convenient to the seat 13, the operator can either elevate the cutter carrying frames 25 into an inoperative position, or permit them to drop by gravity into an operative position.

The rollers B are comparatively heavy so that they will pack or compress the surface of the soil as the machine is advanced, and for this purpose the rollers may have an iron body portion 40 and a periphery formed by longitudinally extending wooden strips 41. Each of the rollers is provided with an axial shaft 42 which is received within short vertical slots 43 formed in the side bars of the frames 25. The rollers are thus permitted to have a slight up and down or vertical movement independently of the frames, and in ordinary practice the slots 43 are about an inch and a half in length.

The reciprocating cutters 23 have smooth end portions 23ª which slide freely within the openings in the guide arms 24, and intermediate toothed portions 23ᵇ which are sharpened to act upon the beet tops with a saw-like action when the machine is in operation. The ends of the cutters are detachably connected by means of pins 44 to the pitmen 22, and it will be observed that the cutters can be readily removed and replaced by fresh cutters which have been sharpened and are in proper condition to act effectively upon the beet tops. When the cutter carrying frames have been lowered into operative position and the machine is advanced with the clutch 9 closed, the cutters 23 are rapidly reciprocated back and forth while the rollers B travel over the surface of the ground, the weight of the rollers causing the ground to be slightly packed or compressed. When operating upon a low beet which has the top thereof substantially flush with the surface of the ground, the roller B will pass over the beet without any appreciable upward movement, and the beet top will be severed by the cutter 23 which is arranged at an elevation slightly above that of the bottom of the roller, preferably about one half inch above the bottom of the roller. If the beet top projects slightly above the surface of the ground, the roller B will rise and pass over the same without lifting the cutter, although if the beet extends a considerable distance above the ground, the shaft 42 of the roller will engage the upper ends of the slots 43 and cause the frame 25 and cutter to be lifted, thereby elevating the cutter so that it will remove the top of the beet without cutting into the beet itself. The provision and mounting of the roller B thus enables the cutter to operate uniformly upon all sizes and conditions of beets, regardless of whether the beets are flush with the surface of the ground or extend upwardly two or three inches above the surface of the ground, as is not infrequently the case. Deflecting plates 45 are arranged back of the cutters 23, being carried by the frames 25 and inclined outwardly in opposite directions. These deflector plates serve to engage the tops which have been severed by the cutters and to throw the tops outwardly in opposite directions away from the frame.

The machine thus operates simultaneously upon the two rows of beets, the tops of the beets being severed by the cutters and deflected laterally in opposite directions.

Having thus described the invention, what I claim as new and desire to secure by Letters Patent, is:—

1. A beet harvester including a main frame, a vertically adjustable cutter frame mounted upon the main frame, a horizontally disposed cylindrical roller journaled upon the cutter frame and mounted to have a limited up and down movement independent of the cutter frame, said roller being arranged to travel over the beets, and support the frame at the proper elevation with respect to the beets, a horizontally disposed reciprocating cutter blade mounted upon the cutter frame back of the roller, and means for actuating the cutter as the main frame is advanced.

2. A beet harvester including a main frame, a series of vertically disposed guide bars upon the main frame, a vertically adjustable cutter frame slidably mounted upon the guide bars, means for raising and lowering the cutter frame, a horizontally disposed cylindrical roller journaled upon the cutter frame and arranged to travel over the beets, and support the frame at the proper elevation with respect to the beets, a horizontally disposed reciprocating blade mounted upon the cutter frame back of the roller, and means for actuating the cutter upon the forward movement of the main frame.

3. A beet harvester including a main frame, keepers thereon, a series of vertically disposed guide bars adjustably mounted within the keepers, a vertically adjustable cutter frame slidably mounted upon the guide bars, means for raising and lowering the cutter frame, a horizontally disposed cylindrical roller journaled upon the cutter frame and arranged to travel over the beets and support the frame at the proper elevation with respect to the beets, a horizontally disposed reciprocating blade cutter mounted upon the frame at the back of the roller, and means for actuating the cutter upon the forward movement of the main frame.

In testimony whereof I have signed my name to this specification in the presence of two subscribing witnesses.

ALBERT BOZEK.

Witnesses:
M. E. CONGDON,
GEORGE W. DALLY.